(12) United States Patent
Kawi et al.

(10) Patent No.: US 9,272,269 B2
(45) Date of Patent: Mar. 1, 2016

(54) CATALYTIC HOLLOW FIBERS

(71) Applicant: National University of Singapore, Singapore (SG)

(72) Inventors: Sibudjing Kawi, Singapore (SG); Kus Hidajat, Singapore (SG); Thawatchai Maneerung, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 14/379,456

(22) PCT Filed: Mar. 8, 2013

(86) PCT No.: PCT/SG2013/000097
§ 371 (c)(1),
(2) Date: Aug. 18, 2014

(87) PCT Pub. No.: WO2013/133771
PCT Pub. Date: Sep. 12, 2013

(65) Prior Publication Data
US 2015/0298102 A1    Oct. 22, 2015

Related U.S. Application Data

(60) Provisional application No. 61/608,161, filed on Mar. 8, 2012.

(51) Int. Cl.
*B01J 20/28* (2006.01)
*B01J 35/00* (2006.01)
(Continued)

(52) U.S. Cl.
CPC .............. *B01J 23/8946* (2013.01); *B01J 21/04* (2013.01); *B01J 23/002* (2013.01); *B01J 23/10* (2013.01);
(Continued)

(58) Field of Classification Search
CPC ...... B01J 35/065; B01J 35/10; B01J 35/1052; B01J 37/02; B01J 23/40; B01J 23/63; B01J 23/66; B01J 23/70; B01J 23/72; B01J 23/74; B01J 23/83; B01J 23/89; B01J 23/8913; B01J 23/8926
USPC ............. 502/4, 245, 262, 303, 327, 330, 331, 502/333, 339; 428/316.6, 317.9, 319.1, 428/332, 337, 357, 364, 689, 701, 702
See application file for complete search history.

(56) References Cited

U.S. PATENT DOCUMENTS

| 4,364,759 A * | 12/1982 | Brooks | .............. B01D 67/0088 210/500.23 |
| 5,633,081 A * | 5/1997 | Clough | .................. C03C 17/27 428/331 |

(Continued)

FOREIGN PATENT DOCUMENTS

WO    WO-99/43610 A1    9/1999

OTHER PUBLICATIONS

Ziemecki et al "Formation of Interstitial Pd-C Phase by Interaction of Ethylene, Acetylene, and Carbon Monoxide with Palladium" J. Am. Chem. Soc. vol. 107, pp. 4547-4548. 1985.

(Continued)

*Primary Examiner* — Cam N. Nguyen
(74) *Attorney, Agent, or Firm* — Cesari and McKenna LLP

(57) ABSTRACT

A hollow fiber for use in production of hydrogen gas. The hollow fiber contains a porous support layer having an outer surface and an inner surface, a catalyst layer coated on the outer surface, and a selection layer coated on the inner surface. Also disclosed is a method of preparing such a hollow fiber.

24 Claims, 11 Drawing Sheets

(51) Int. Cl.

| | |
|---|---|
| *B01J 21/00* | (2006.01) |
| *B01J 23/00* | (2006.01) |
| *B01J 23/40* | (2006.01) |
| *B01J 23/42* | (2006.01) |
| *B01J 23/44* | (2006.01) |
| *B01J 23/58* | (2006.01) |
| *B01J 23/72* | (2006.01) |
| *B32B 3/00* | (2006.01) |
| *B32B 3/26* | (2006.01) |
| *B32B 5/22* | (2006.01) |
| *B32B 9/00* | (2006.01) |
| *B32B 19/00* | (2006.01) |
| *G11B 11/105* | (2006.01) |
| *G11B 5/33* | (2006.01) |
| *C09J 7/02* | (2006.01) |
| *D02G 3/00* | (2006.01) |
| *B01J 23/89* | (2006.01) |
| *B01J 23/83* | (2006.01) |
| *B01J 23/50* | (2006.01) |
| *B01J 21/04* | (2006.01) |
| *B01J 23/10* | (2006.01) |
| *B01J 35/06* | (2006.01) |
| *B01J 35/02* | (2006.01) |
| *B01J 37/02* | (2006.01) |

(52) U.S. Cl.
CPC ....... *B01J 23/50* (2013.01); *B01J 23/83* (2013.01); *B01J 35/0006* (2013.01); *B01J 35/023* (2013.01); *B01J 35/065* (2013.01); *B01J 37/0244* (2013.01); *B01J 2523/00* (2013.01)

(56) References Cited

U.S. PATENT DOCUMENTS

| | | | | | |
|---|---|---|---|---|---|
| 6,017,455 | A  * | 1/2000 | Shimoda | ............ | B01D 67/0011 210/500.23 |
| 6,471,745 | B1 * | 10/2002 | Foley | ............ | B01D 71/021 502/182 |
| 6,649,255 | B1 * | 11/2003 | Fain, Sr. | ............ | B01D 53/228 210/500.25 |
| 6,808,768 | B2 * | 10/2004 | Satou | ............ | B41M 5/5218 428/304.4 |
| 6,821,501 | B2 | 11/2004 | Matzakos et al. | | |
| 7,560,090 | B2 | 7/2009 | Nakamura et al. | | |
| 7,700,184 | B2 * | 4/2010 | Harold | ............ | B01D 67/0041 427/230 |
| 8,222,166 | B2 * | 7/2012 | Chu | ............ | B01D 65/08 428/221 |
| 8,263,685 | B2 * | 9/2012 | Yadav | ............ | B82Y 30/00 428/332 |
| 8,586,166 | B2 * | 11/2013 | Ohno | ............ | B01D 46/2418 428/116 |
| 2002/0195188 | A1 * | 12/2002 | Kuhstoss | ............ | B01D 39/2075 156/89.16 |
| 2008/0176060 | A1 | 7/2008 | Harold et al. | | |
| 2008/0226544 | A1 | 9/2008 | Nakamura et al. | | |
| 2008/0241058 | A1 | 10/2008 | Hattori et al. | | |
| 2008/0311014 | A1 | 12/2008 | Nakamura et al. | | |
| 2009/0053512 | A1 * | 2/2009 | Pyun | ............ | G11B 5/712 428/336 |
| 2010/0092353 | A1 | 4/2010 | Noda | | |
| 2010/0221159 | A1 * | 9/2010 | Insley | ............ | B01D 53/864 422/211 |
| 2011/0027163 | A1 * | 2/2011 | Shinohara | ............ | B01J 29/046 423/447.2 |

OTHER PUBLICATIONS

Itoh "Limiting Conversions of Dehydrogenation in Palladium Membrane Reactors" Catalysis Today vol. 25, pp. 351-356. 1995.

Cheng et al "Palladium-Silver Composite Membranes by Electroless Plating Technique" Journal of Membrane Science vol. 158, pp. 127-141. 1999.

Pan et al "Thin Dense Pd Membranes Supported on β-A12O3 Hollow Fibers" Chemical Communication vol. 24, pp. 2536-2537. 2001.

Mardilovich et al "Dependence of Hydrogen Flux on the Pore Size and Plating Surface Topology of Asymmetric Pd-Porous Stainless Steel Membranes" Desalination vol. 144, pp. 85-89. 2002.

Basile et al "Co-Current and Counter-Current Modes for Water Gas Shift Membrane Reactor" Catalysis Today vol. 82, pp. 275-281. 2003.

Li et al "PdC Formation in Ultra-Thin Pd Membranes During Separation of $H_2$/CO Mixtures" Journal of Membrane Science vol. 299, pp. 130-137. 2007.

Rahman et al "Development of a Catalytic Hollow Fibre Membrane Micro-Reactor for High Purity $H_2$ Production" Journal of Membrane Science vol. 368, pp. 116-123. 2011.

* cited by examiner

CATALYTIC HOLLOW FIBERS

CROSS REFERENCE TO RELATED APPLICATIONS

This application is the National Stage of International Application No. PCT/SG2013/000097, filed on Mar. 8, 2013, which claims the benefit of US Provisional Application No. 61/608,161, filed on Mar. 8, 2012. The contents of both applications are hereby incorporated by reference in their entirety.

BACKGROUND

Catalytic membrane reactors are useful for producing hydrogen gas, a green energy source.

A conventional membrane reactor typically contains a catalyst bed, either packed inside the tubular support of the reactor or arranged outside the tubular support, and a palladium or palladium-alloy membrane coated on the outer surface of the tubular support. The membrane reactor converts hydrocarbons to hydrogen gas by the reforming reaction in the catalyst bed. The hydrogen gas thus generated is separated from the reaction mixture through the palladium or palladium-alloy membrane. See Amiridis et al., International Patent Application Publication WO 1999/043610 A1; and Hattori et al., US Patent Application Publication US 2008/0241058 A1.

During the reforming reaction, residual carbonaceous materials, formed and deposited in the catalyst bed, cause coke formation, which gradually deteriorates catalyst efficiency and leads to a dangerous pressure build-up inside the membrane reactor. Further, in a conventional membrane reactor, the palladium or palladium-alloy membrane is subjected to cracking as it is on the outside surface of the tubular support and exposes to catalyst particles and high temperature. Such reactors are therefore not durable. See Nakamura et al., US Patent Application Publication 2008/0226544 A1.

There is a need to develop a safe and durable membrane reactor useful for producing hydrogen gas.

SUMMARY

The catalytic hollow fiber of this invention exhibits, unexpectedly, both high safety and great durability in producing hydrogen gas in a membrane reactor.

One aspect of this invention relates to a hollow fiber having an outer diameter of 500 to 4000 μm (e.g., 1000 to 3000 μm) and an inner diameter of 100 to 2000 μm (800 to 1600 μm). It contains three layers: (i) a porous support layer having an outer surface and an inner surface, (ii) a catalyst layer coated on the outer surface, and (iii) a selection layer coated on the inner surface.

The support layer has a thickness of 100 to 500 μm (e.g., 150 to 250 μm) and a pore size of 50 to 400 nm (e.g., 100 to 300 nm). The catalyst layer has a thickness of 100 to 500 μm (e.g., 150 to 250 μm) and a pore size of 200 to 2000 nm (e.g. 400 to 1500 nm). It contains a catalyst, which causes or accelerates the production of hydrogen gas in a chemical reaction, e.g., a reforming reaction. Examples of the catalyst include a metal or metal oxide containing Fe, Ni, Co, Cu, Mo, Rh, Ru, Pd, La, or a combination thereof (e.g., $LaNiO_3$). The selection layer has a thickness of 0.3 to 10 μm (e.g., 0.3 to 2 μm and 0.3 to 0.8 μm). It contains a palladium or palladium-alloy film that selectively permeates hydrogen gas. A palladium alloy is an alloy of palladium and a metal such as Pt, Ni, Ag, Ta, V, Y, Nb, Ce, In, Ho, La, Au, and Ru (e.g., palladium-silver alloy, palladium-silver-copper alloy, palladium-silver-cobalt alloy, palladium-gold-cobalt alloy, palladium-gold-iridium alloy, and palladium-gold-rhodium alloy). More examples are described in Matzakos et al., U.S. Pat. No. 6,821,501 and Noda, US Patent Application Publication 2010/0092353. A preferred palladium-alloy film contains palladium-silver alloy that has 20-30% silver by weight.

Another aspect of this invention relates to a method of preparing the hollow fiber described above. The method includes the steps of: (1) providing a porous hollow fiber support having an outer surface, an inner surface, an outer diameter of 200 to 3000 μm, and an inner diameter of 100 to 2000 μm; (2) coating a catalyst layer on the outer surface; and (3) coating a selection layer on the inner surface, thereby forming the hollow fiber. Optionally, the method also includes, before step (3), forming a protection film covering the catalyst layer; and, after step (3), removing the protection film.

The details of one or more embodiments of the invention are set forth in the description and the drawings below. Other features, objects, and advantages of the invention will be apparent from the description, the drawings, and the claims.

BRIEF DESCRIPTION OF DRAWINGS

FIG. 4(*a*) is the SEM image of comparative hollow fiber 3'; FIG. 4(*b*) is the SEM image of hollow fiber 3; and FIG. 4(*c*) is the SEM image of hollow fiber 3 at 100× magnification.

FIG. 6(*b*) shows $H_2$ and $N_2$ permeation flux and $H_2$ selectivity of hollow fiber 3 during a stability test (5 cycles, 10 hours/cycle) at a temperature of 450° C. and a pressure difference of 100 kPa.

FIG. 10 is a graph showing $H_2$ recovery rates during decomposition of methane in hollow fiber 2, a hollow fiber of

DETAILED DESCRIPTION

Figure 1:
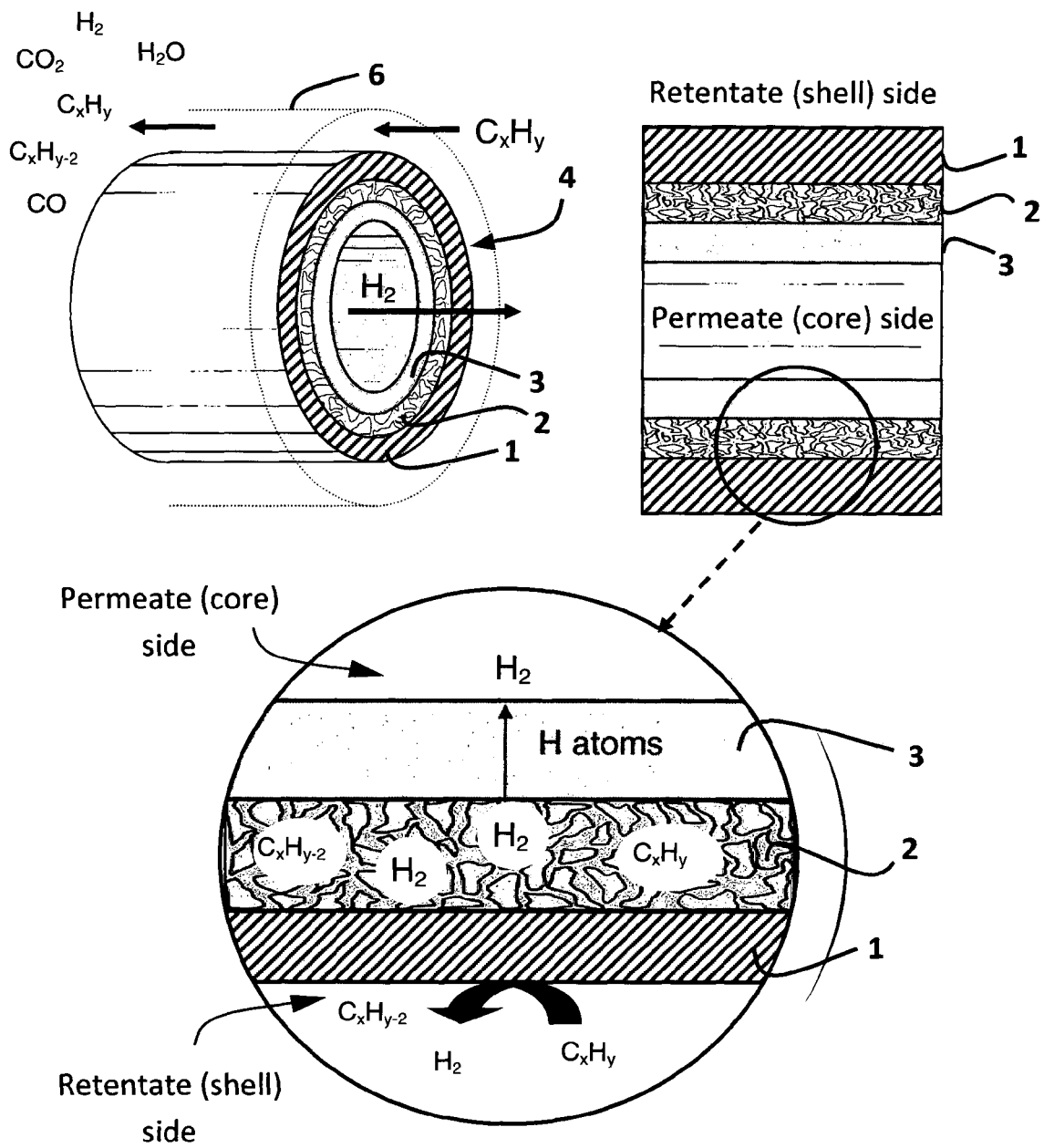
FIG. 1 is a schematic diagram of a hollow fiber of this invention.

FIG. 1 schematically shows an embodiment of the hollow fiber of this invention, i.e., hollow fiber 4. It contains three layers: (i) porous support layer 2, (ii) catalyst layer 1 coated on the outer surface of support layer 2, and (iii) selection layer 3 coated on the inner surface of support layer 2. Also shown in this figure is reactor shell 6.

Support layer 2 is formed of porous materials, e.g., ceramic materials that have high mechanic strength, high thermal stability, and high chemical resistance. Examples include, but are not limited to, titania, silica, and alumina (e.g., $\alpha\text{-}Al_2O_3$). Optionally, two or more ceramic materials are used to prepare the support layer. $CeO2$, $\gamma\text{-}Al_2O_3$, or yttria-stabilized zirconia ("YSZ") can be used together with $\alpha\text{-}Al_2O_3$ to form a porous support having a large surface area and small pores, e.g., a pore size of 10-100 nm. If YSZ is used with $\alpha\text{-}Al_2O_3$, its preferred amount is 10-50% (e.g., 20%) by weight of $\alpha\text{-}Al_2O_3$.

Referring back to FIG. 1, catalyst layer 1, containing a catalyst, is coated on the outer surface of support layer 2, in which reforming reactions take place. As shown in this figure, hydrocarbons, i.e., $C_xH_y$, upon contact with catalyst layer 1 on the retentate side (or shell side) of hollow fiber 4, is converted to $H_2$ and other gases such as $CO_2$, $CO$, $H_2O$, and $C_xH_{y-2}$ at a high temperature (e.g., 450-600° C.). $H_2$ passes through selection layer 3, enters the permeate side (or core side) of hollow fiber 4, and is thus separated from the mixture on the retentate side.

Turning to selection layer 3, it is formed of palladium or a palladium alloy, e.g., a palladium-silver alloy. This layer, interlocked with support layer 2 on its inner surface, is an ultrathin and dense film free of any defects, which selectively permeates hydrogen gas. A thinner palladium or palladium alloy film is not only more cost effective but also provides higher permeability of hydrogen gas as compared to a thicker film. A thickness of 2 μm or less is preferred. This film typically has a hydrogen permeation flux of 0.4-1.2 mol $m^{-2}s^{-1}$ (e.g., 0.45-0.55 mol $m^{-2}s^{-1}$) and a hydrogen selectivity (over nitrogen) of 500-1500 (e.g., 1000-1500).

Selection layer 3 (i.e., the inner layer) is separated from catalyst layer 1 (the outer layer) by support layer 2, providing protection for selection layer 3 from mechanical damages (e.g., scratching) and exposure to high temperature resulting from sudden combustion of hydrocarbons in the reforming reaction. Further, catalyst layer 1 is coated on the outer surface of support layer 2. Coke formation is avoided. Therefore, the hollow fiber of this invention is not only safe, it is also durable even at high temperature and high pressure.

Figure 2:
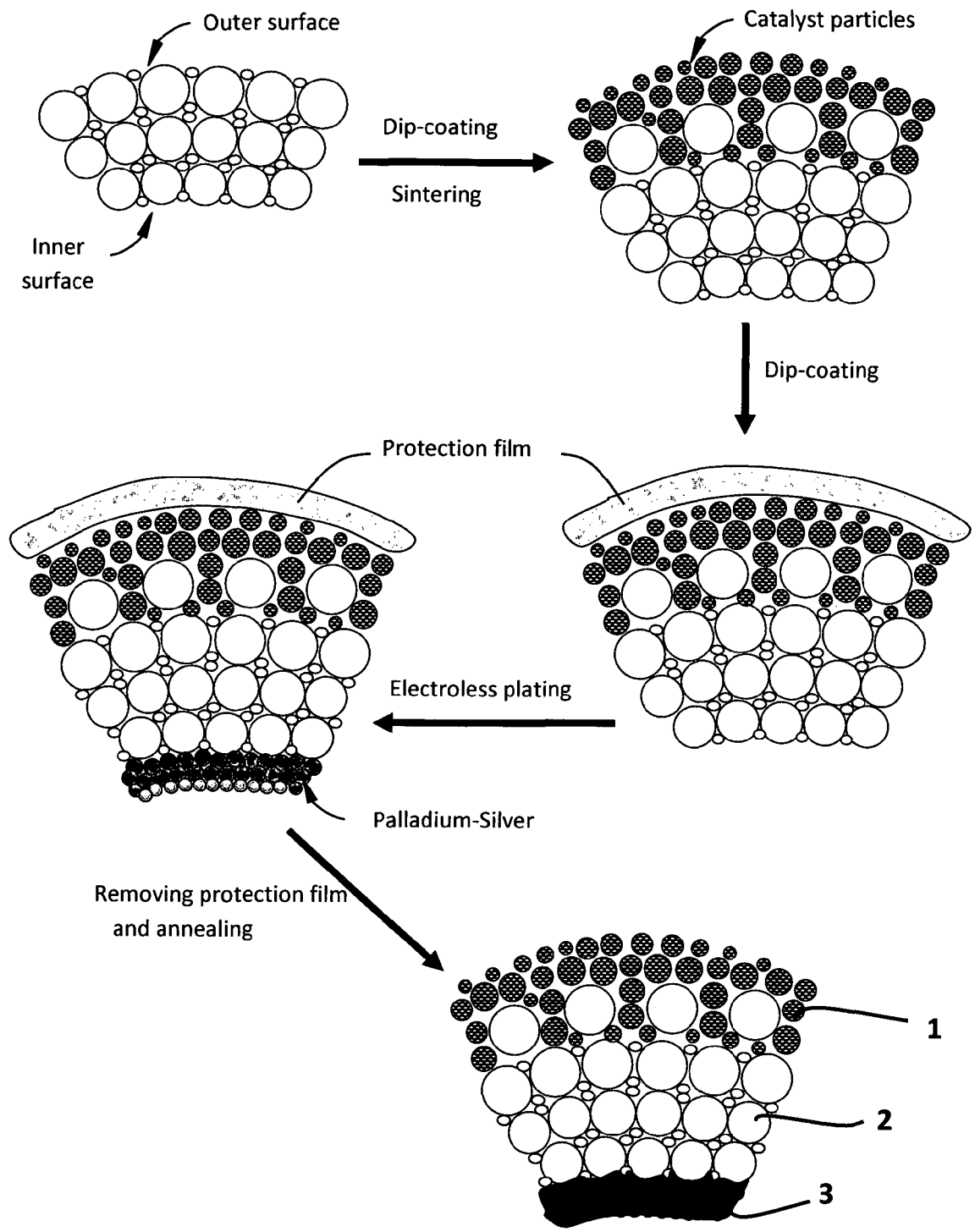
FIG. 2 is a schematic diagram of a method of preparing a hollow fiber of the invention.

Also within the scope of this invention is a method of preparing the above described catalytic hollow fibers. FIG. 2 illustrates an exemplary preparing process: (1) providing a porous hollow fiber support (e.g., containing $\alpha\text{-}Al_2O_3$ and YSZ) having an outer surface and an inner surface; (2) coating a catalyst layer on the outer surface, e.g., by a dip-coating method, and optionally sintering the support and the catalyst layer (e.g., at 20-1100° C. for 1-12 hours); (3) forming a protection film (e.g., by dip coating) to cover the catalyst layer; (4) coating a selection layer on the inner surface (e.g., by an electroless plating method); (5) removing the protection film; and (6) annealing the hollow fiber precursor thus obtained (e.g., at 60-480° C. for 1-10 hours), thereby forming the hollow fiber having catalyst layer 1, support layer 2 and selection layer 3.

Figure 3:
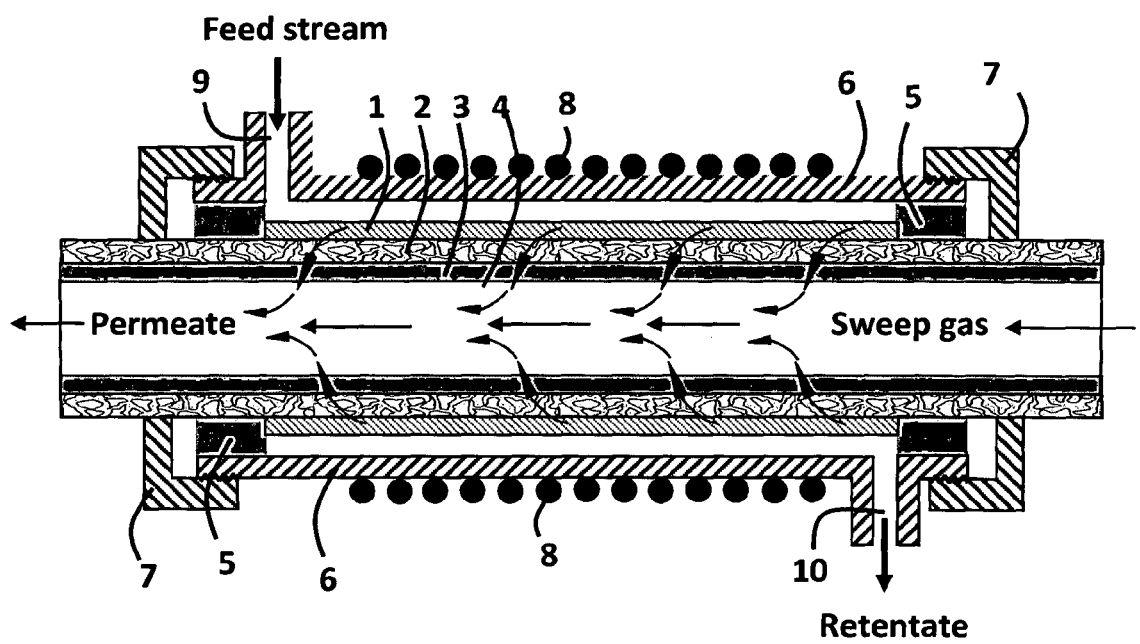
FIG. 3 is a schematic cross-sectional view of a reactor containing a hollow fiber of this invention.

Still within the scope of this invention is a reactor containing the hollow fiber described above, useful for producing hydrogen gas via the reforming reaction, e.g., catalytic decomposition of methane. FIG. 3 schematically shows a cross-sectional view of an exemplary reactor, which includes hollow fiber 4 containing catalyst layer 1, support layer 2, and selection layer 3. Both ends of the reactor are sealed using reactor shell 6, which can be formed of stainless steel, gas-tight material 5, and terminal closure member 7. Gas-tight material 5 can be an epoxy resin or a silicon rubber, preferably a silicon rubber having a temperature resistance of at least 450° C. During operation of the reactor, the central portion of the reactor is heated, preferably using electrical heating wires 8 around reactor shell 6; the feed stream, i.e., hydrocarbons shown as $C_xH_y$ in FIG. 1, enters the reactor via gas inlet 9; $C_xH_y$ is converted to $H_2$ and other gases such as $CO_2$, $CO$, $H_2O$, and $C_xH_{y-2}$; $H_2$ passes through selection layer 3 and becomes permeate which is carried out of hollow fiber 4 by the sweep gas; and retentate including $CO_2$, $CO$, $H_2O$, $C_xH_{y-2}$, unreacted $C_xH_y$, and remaining $H_2$, exits the reactor via gas outlet 10.

The reactor described above is operated either in a concurrent or counter-current configuration. In a concurrent configuration, the sweep gas, e.g., $N_2$ and He, flows in the same direction as the feed stream, i.e., hydrocarbons. On the other hand, in the counter-current configuration, the sweep gas flows in the opposite direction as the feed stream. FIG. 3 shows that the reactor is operated in the counter-current configuration as an example.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

EXAMPLE 1

An exemplary hollow fiber, i.e., hollow fiber 1, was prepared following the procedures described below.

Preparing a Hollow Fiber Support

A porous hollow fiber support containing a ceramic material, i.e., $\alpha\text{-}Al_2O_3$, was prepared by a phase-inversion method. More specifically, a mixture of 20 vol % N-methyl-2-pyrrolidone ("NMP") and 80 vol % water was used as both internal and external coagulants. A mixture of NMP (42 wt %) and polyethersulfone ("PESF"; 8 wt %) was used as a polymer solution. The ceramic material was slowly added to the polymer solution at room temperature under continuous stirring until a homogeneous ceramic-polymer dope was obtained, which was extruded under $N_2$ at 1.5 bar through a tube-in-orifice spinneret (tube/orifice diameter, 0.72/2.0 mm) at a controlled extrusion rate. The internal coagulant continuously flew through the inner tube of the spinneret during the extrusion. The thus-obtained nascent hollow fiber support passed through an air-gap of 1 cm before falling into the external coagulant. After the nascent hollow fiber support was completely solidified in the external coagulant during a period of 24 hours, it was cut into 25-cm segments, washed with water, and air-dried at room temperature. Finally, these segments were sintered at 500° C. at a heating rate of 1° C./minute for 2 hours to remove the polymer, followed by sintering at 1600° C. at a heating rate of 2° C./minute for 10 hours to yield a hollow fiber support.

Coating a Catalyst Layer

A catalyst layer formed of $LaNiO_3$ perovskite was coated on the outer surface of the hollow fiber support by a dip-coating and phase-inversion method. More particularly, 30 wt % of $LaNiO_3$ perovskite, 20 wt % of $\alpha$-$Al_2O_3$, and 50 wt % of the polymer solution were mixed under continuous stirring for 24 hours to obtain a catalyst-polymer dope solution. The hollow fiber support was dipped into the dope solution. The thickness of the catalyst layer was controlled (e.g., 50 to 300 μm) in order to obtain a $LaNiO_3$ perovskite content of 50 to 250 mg. More specifically, a catalyst layer having a thickness of 200 μm was obtained, containing 200 mg of $LaNiO_3$ peovskite. The hollow fiber support and the catalyst layer were sintered at 1100° C. at a heating rate of 1° C./min to obtain a double-layered hollow fiber support.

Coating a Selection Layer

A selection layer, i.e., a palladium-silver alloy film, was coated on the inner surface of the hollow fiber support by a sequence electroless plating method. First, the external surface of the doubled-layered hollow fiber support was coated with a protection film by applying a mixture of 42 wt % NMP and 8 wt % PESF to the hollow fiber support. The protection film prevented deposition of palladium and silver on the catalyst layer during the electroless plating. After the protection film was applied, the double-layered hollow fiber was dipped into a 1 mM $HNO_3$ aqueous solution for two hours to remove any contaminating substrate adherent to the inner surface. Prior to electroless plating of palladium and silver, the double-layered hollow fiber was sensitized using a $SnCl_2$ solution for pattern delineation and activated using a $PdCl_2$ solution to provide Pd nuclei pre-seeding. These two steps ensured more uniform deposition and also made the inner surface of the hollow fiber support more active for electroless deposition. More specifically, the cleaned double-layered hollow fiber support was immersed in a 5 mM $SnCl_2$ solution at 50° C. for 20 mM and then rinsed with water. It was further immersed in a 5 mM $PdCl_2$ solution at 50° C. for 20 min and also rinsed with water. This immersing-rinsing procedure was repeated for five times to obtain a highly uniformed Pd nuclei seeding on the inner surface, which was used to initiate deposition of palladium and silver.

Two plating solutions, i.e., a Pd plating solution and an Ag plating solution, were prepared using the composition shown in Table 1 below. To obtain the Pd plating solution, $PdCl_2$, $Na_2EDTA$, and $NH_4OH$ were added to 50 ml of 0.1 M HCl aqueous solution under continuous stirring until a homogenous clear solution was obtained. Similarly, to obtain the Ag plating solution, $AgNO_3$, $Na_2EDTA$, and $NH_4OH$ were added to 50 ml of 0.1 M $HNO_3$ to obtain a homogenous clear solution. The pH of both plating solutions were adjusted to 8-9 using 20% $NH_4OH$ solution. Finally, 0.3 ml of 1 M $N_2H_4 \cdot H_2O$ was slowly added to the pH-adjusted plating solutions to start deposition of palladium and silver: Namely, the hollow fiber support was first immersed in the palladium plating solution and thoroughly washed with water. It was then immersed in the silver plating solution and also subsequently washed with water. After plating, the hollow fiber having a protection layer was air-dried at 60° C. The thickness of palladium-silver layer was controlled by the immersing time and measured by the weight difference between the initial and final membranes. The polymer protection layer on the outer catalyst layer was mechanically or chemically removed to obtain a hollow fiber precursor, which was annealed at 480° C. for 10 hours under $H_2$ atmosphere to form a palladium-silver alloy with a dense structure.

TABLE 1

Composition and condition of the electroless plating baths of Pd and Ag

| Pd plating solution | | Ag plating solution | |
| --- | --- | --- | --- |
| Component | Quantity | Component | Quantity |
| $PdCl_2$ | 0.38 g | $AgNO_3$ | 0.40 g |
| $Na_2EDTA$ | 2 g | $Na_2EDTA$ | 2 g |
| $NH_4OH$ (28%) | 15 g | $NH_4OH$ (28%) | 15 g |
| HCl (0.1M) | 50 ml | $HNO_3$ (0.1M) | 50 ml |
| $N_2H_4 \cdot H_2O$ (1M) | 0.3 ml | $N_2H_4 \cdot H_2O$ (1M) | 0.3 ml |
| Temperature (° C.) | 50 | Temperature (° C.) | 60 |
| pH | 8-9 | pH | 8-9 |

The hollow fiber thus obtained, i.e., hollow fiber 1, had an outer diameter of 2000 μm, an inner diameter of 1200 μm, and a thickness of 400 to 500 μm including a support layer of about 200 to 250 μm, a catalyst layer of 200 μm, and an ultrathin selection layer of less than 2 μm.

Hollow fiber 1, as well as hollow fiber 2 described in Example 2 below, was subjected to Energy-Dispersive X-ray spectrometry (EDX) to determine the composition of its palladium-silver selection layer. It was found that the average silver content, for both hollow fiber 1 and hollow fiber 2, was 21 wt %, in line with a preferred silver wt %, i.e., 20-30 wt %, in the selection layer. See Cheng et al., Journal of Membrane Science, 158, 127-41(1999).

Also measured were physical properties of hollow fiber 1, i.e., volumetric porosity, mechanical strength, internal pore size, and amount of pores. These data are shown in Table 2 below.

Note that the physical properties of hollow fiber 2 described below are also shown in Table 2. Comparison of hollow fibers 1 and 2 is discussed in Example 2 below.

TABLE 2

Summary of physical properties of porous hollow fiber membrane support

| Hollow Fiber | $YSZ:Al_2O_3$ (weight %) | Volumetric porosity (%) | Mechanical strength (MPa) | Internal diameter pore size (μm) | | Amount of pores on surface | |
| --- | --- | --- | --- | --- | --- | --- | --- |
| | | | | Maximum | Average | External | Internal |
| 1 | 0:100 | 361.3 | 358.9 | 0.435 | 0.390 | many | little |
| 2 | 20:80 | 265.4 | 416.2 | 0.126 | 0.068 | little | rare |

EXAMPLE 2

Hollow fiber 2 was prepared following exactly the same procedure as described in Example 1 except that the ceramic used to prepare the hollow fiber support was $\alpha$-$Al_2O_3$ and 20% YSZ (by weight of $\alpha$-$Al_2O_3$) instead of $\alpha$-$Al_2O_3$ solely.

Physical properties of hollow fiber 2 were measured and summarized in Table 2 above.

Hollow fiber 2, containing α-$Al_2O_3$ and YSZ, showed a smaller pore size and a higher mechanical strength than hollow fiber 1. These results suggest that smaller particles of YSZ helped minimize the amount and size of pores on the surface of the support layer.

A comparative conventional fixed-bed reactor was prepared, in which solid catalyst particles are packed in a tubular reactor.

Figure 8:
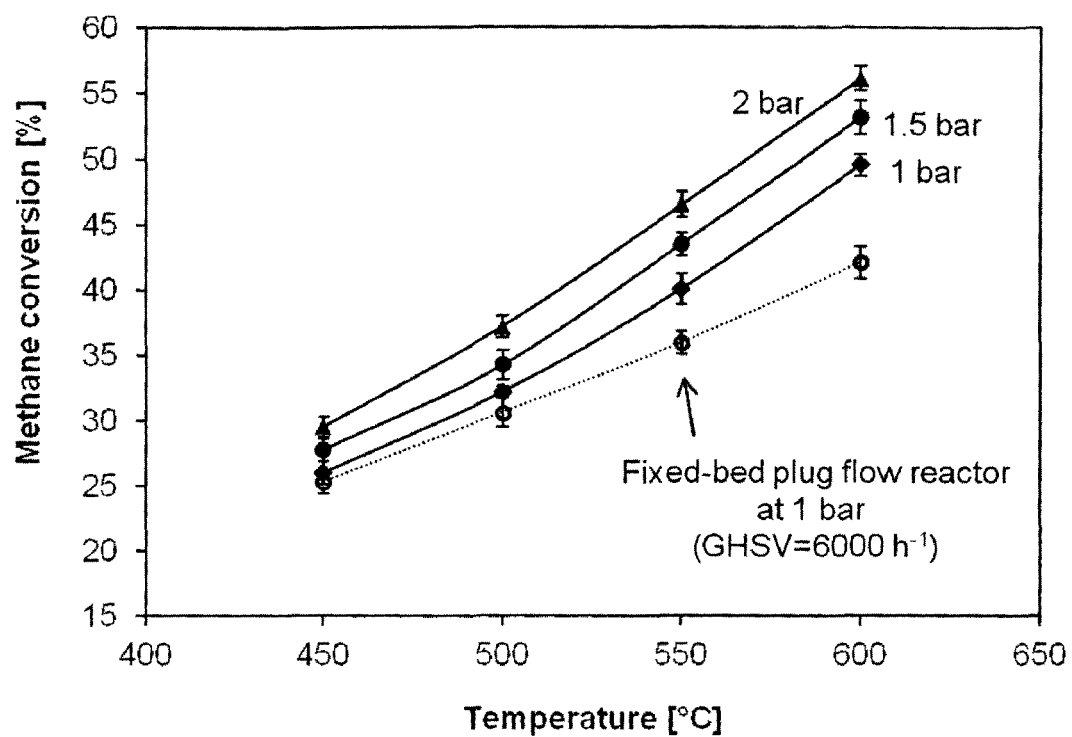
FIG. 8 is a graph showing methane conversion rates as a function of reaction temperature during decomposition of methane in a conventional fixed-bed reactor and hollow fiber 2, a hollow fiber of this invention, at different reaction pressures, i.e., 1 bar, 1.5 bar, and 2 bar.
Figure 9:
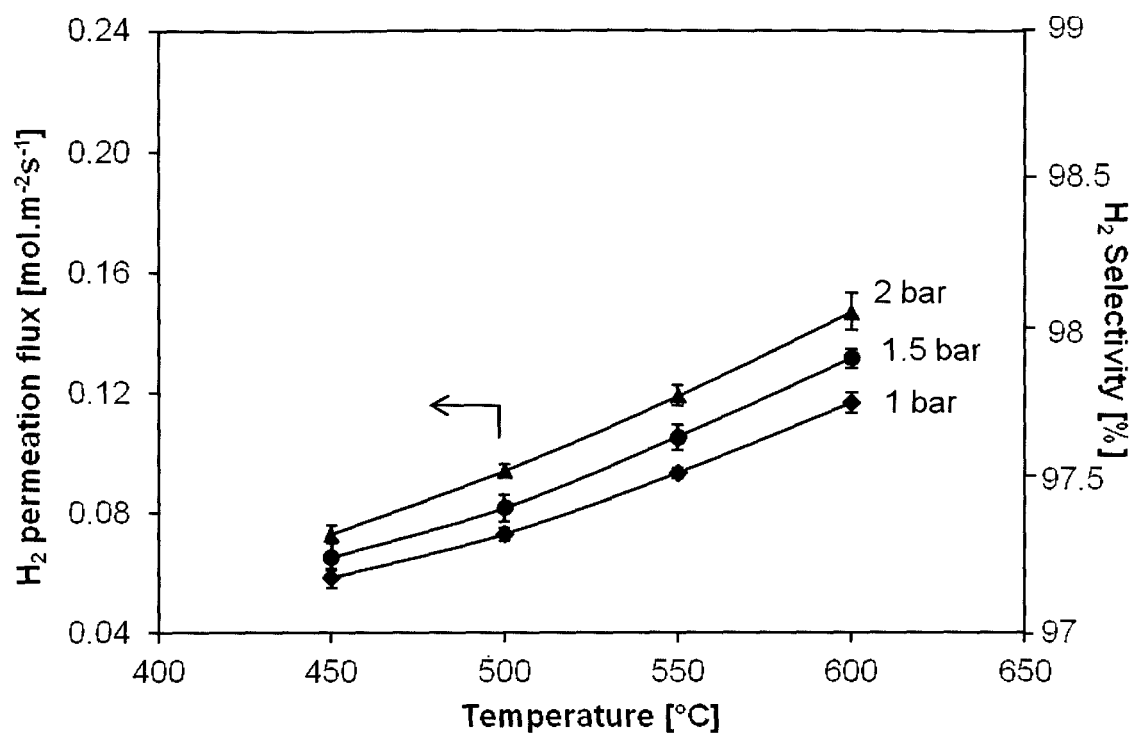
FIG. 9 is a graph showing $H_2$ permeation flux and hydrogen selectivity during decomposition of methane in hollow fiber 2, a hollow fiber of this invention, as a function of reaction temperature at different reaction pressures, i.e., 1 bar, 1.5 bar, and 2 bar.
Figure 10:
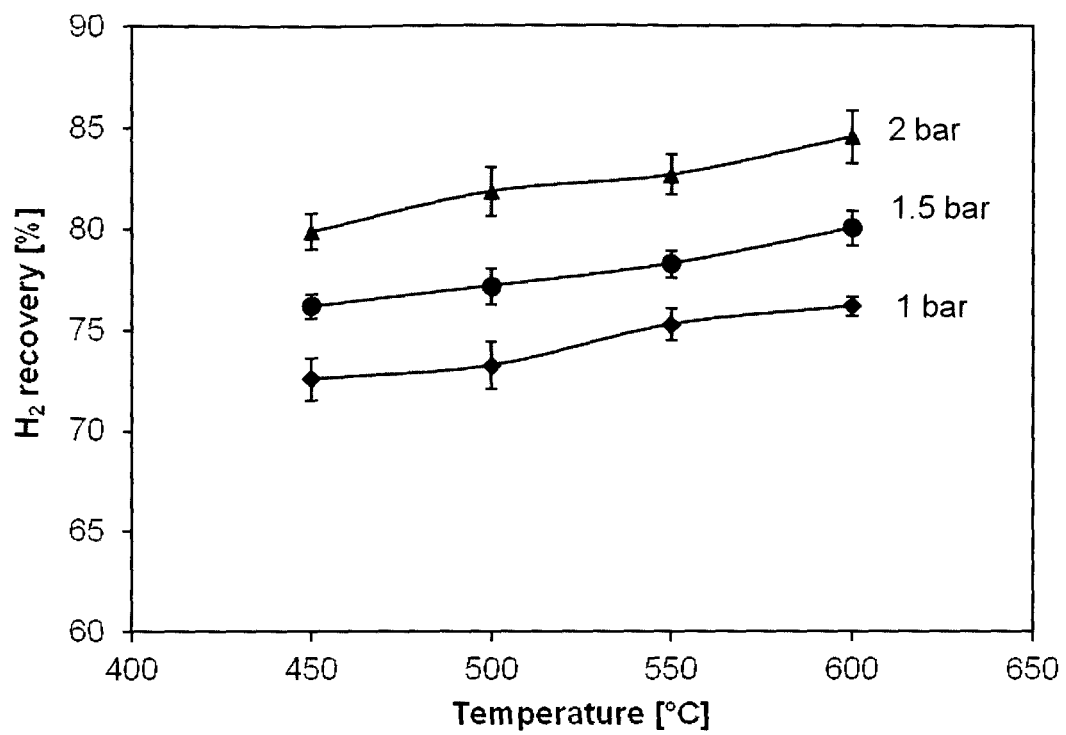

The performance of hollow fiber 2 and the conventional fixed-bed reactor was tested as shown in Example 8 below. The results are shown in FIGS. 8-10 and discussed in detail in Example 8.

EXAMPLE 3

Hollow fiber 3 was prepared following the same procedure as described in Example 2 except that no catalyst layer was coated onto the outer surface of the hollow fiber support and the thickness of the selection layer was 1.2 μm.

Comparative hollow fiber 3' was prepared in the same way as hollow fiber 3 except that the selection layer was coated on the outer surface of the hollow fiber support.

SEM Images

Figure 4:
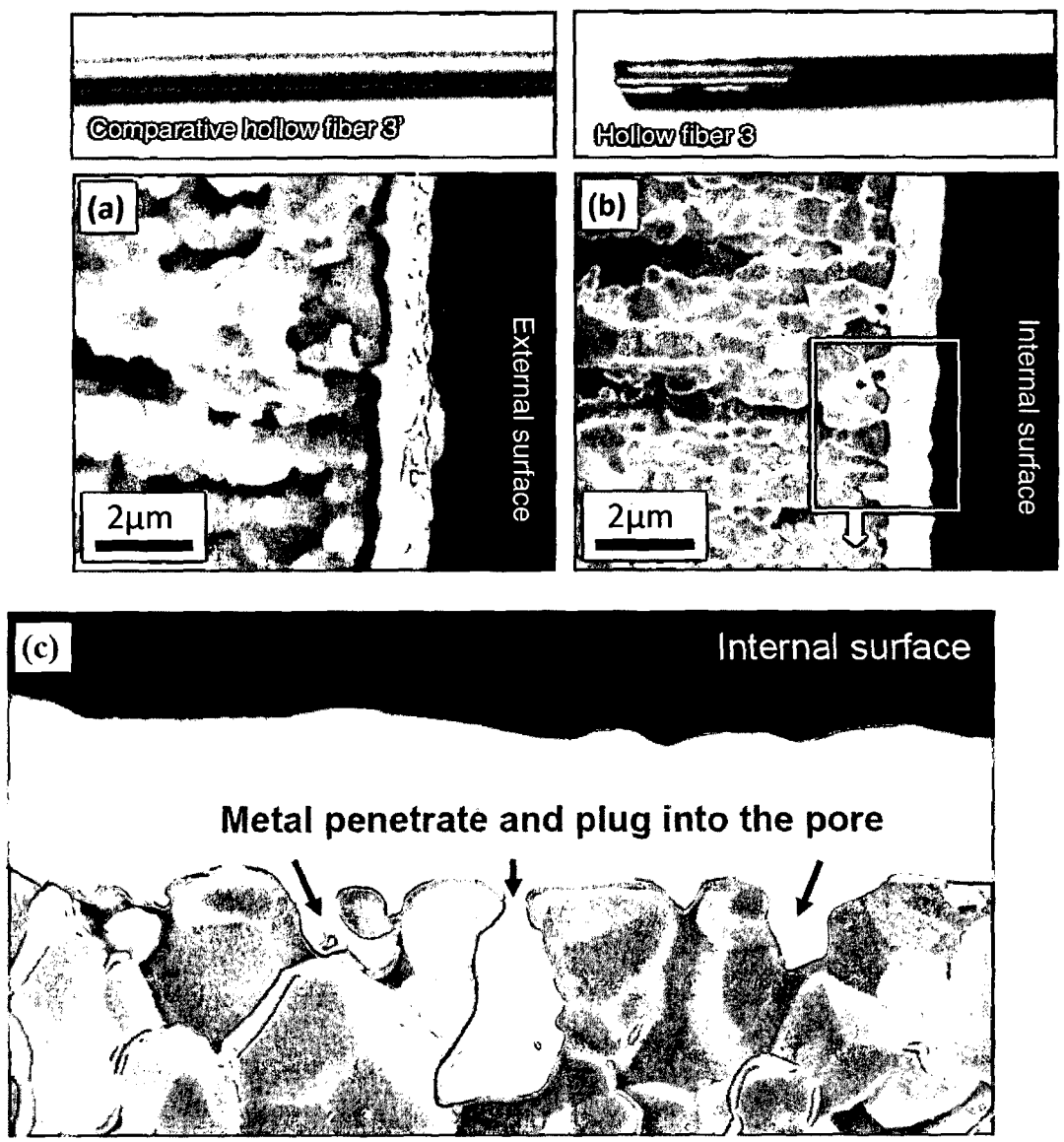
FIG. 4 shows the SEM images of hollow fiber 3, a hollow fiber of this invention, and comparative hollow fiber 3', which had a selection layer on its outer surface.

Both hollow fiber 3 and comparative hollow fiber 3' were viewed under a scanning electron microscope (SEM). FIG. 4 shows the SEM images of the cross-sectional structure of hollow fiber 3, i.e., FIGS. 4(*b*) and (*c*), and that of the comparative hollow fiber 3', i.e., FIG. 4(*a*). Delamination, observed in comparative hollow fiber 3', was identified as the primary reason for cracking of this hollow fiber at a high temperature, which in turn resulted in loss of $H_2$ selectivity as described below. Unexpectedly, hollow fiber 3, showing no delamination, exhibited a stronger adhesion between the selection layer and the support layer. Indeed, the palladium-silver alloy of the selection layer interlocked with (more specifically, penetrated and plugged into) the pores of the selection layer, as shown in FIGS. 4(*b*) and (*c*).

Figure 5:
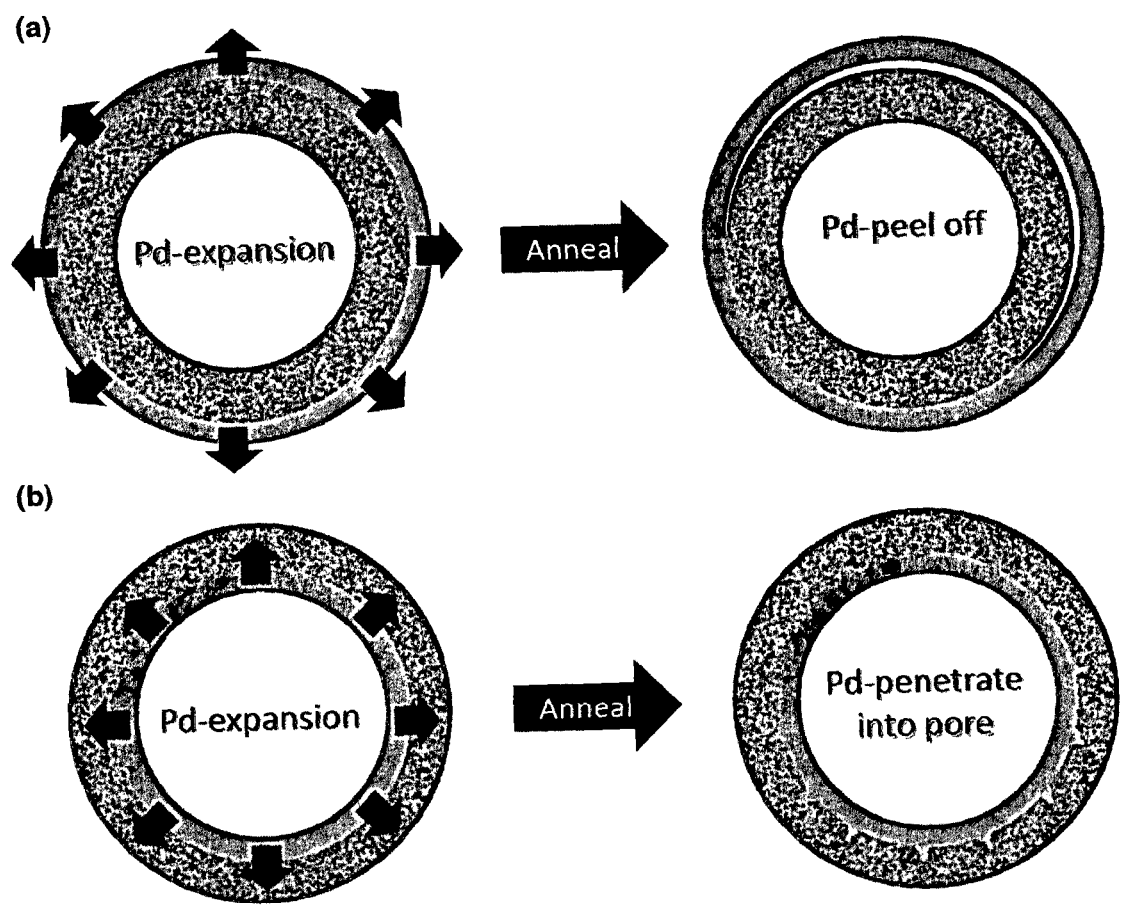
FIG. 5 is a schematic diagram showing (a) delaminating of the selection layer of a comparative hollow fiber having an outer selection layer and (b) penetration of the selection layer into the support layer in a hollow fiber of this invention.

Interlocking occurred at the annealing step of preparing the hollow fiber as the thermal-expansion coefficient of the palladium-silver alloy (~$10^{-7}$ $K^{-1}$, indicating a higher thermal expansion) is different from that of the hollow fiber support (~$10^{-6}$ $K^{-1}$, indicating a lower thermal expansion). FIG. 5 shows that during annealing of a hollow fiber having an outer selection layer, e.g., comparative hollow fiber 3', its palladium-silver alloy moves away from the hollow fiber support, causing delamination as shown in FIG. 5(*a*); and, in a hollow fiber having an inner selection layer, e.g., hollow fiber 3, the palladium-silver alloy unexpectedly penetrates into the pores of the hollow fiber support, interlocking the selection layer and the support layer as shown in FIG. 5(*b*).

Durability

Both hollow fiber 3 and comparative hollow fiber 3' were subjected to hydrogen permeation tests following the procedure described in Example 7 below. Five cycles were performed. Each cycle lasted for 10 hours. The results are shown in FIGS. 6(*a*) and (*b*).

Figure 6A:
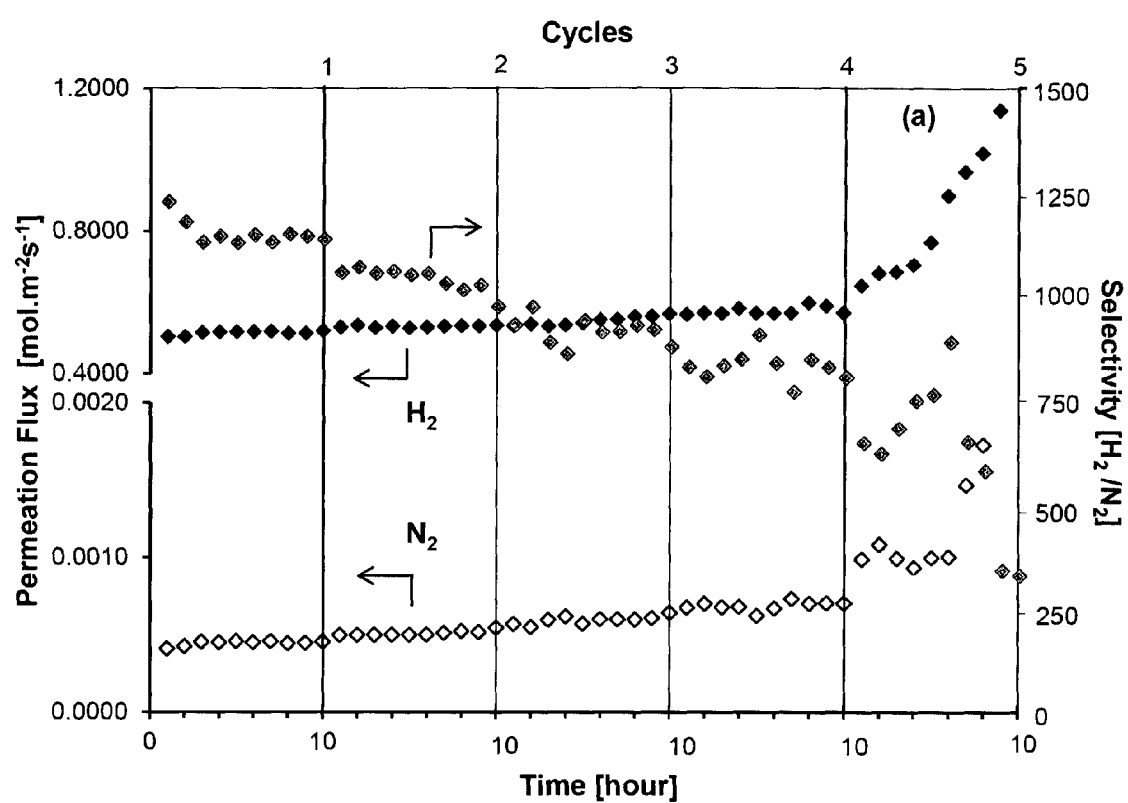
FIG. 6(*a*) shows $H_2$ and $N_2$ permeation flux and $H_2$ selectivity of comparative hollow fiber 3' during a stability test (5 cycles, 10 hours/cycle) at a temperature of 450° C. and a pressure difference of 100 kPa.
Figure 6B:
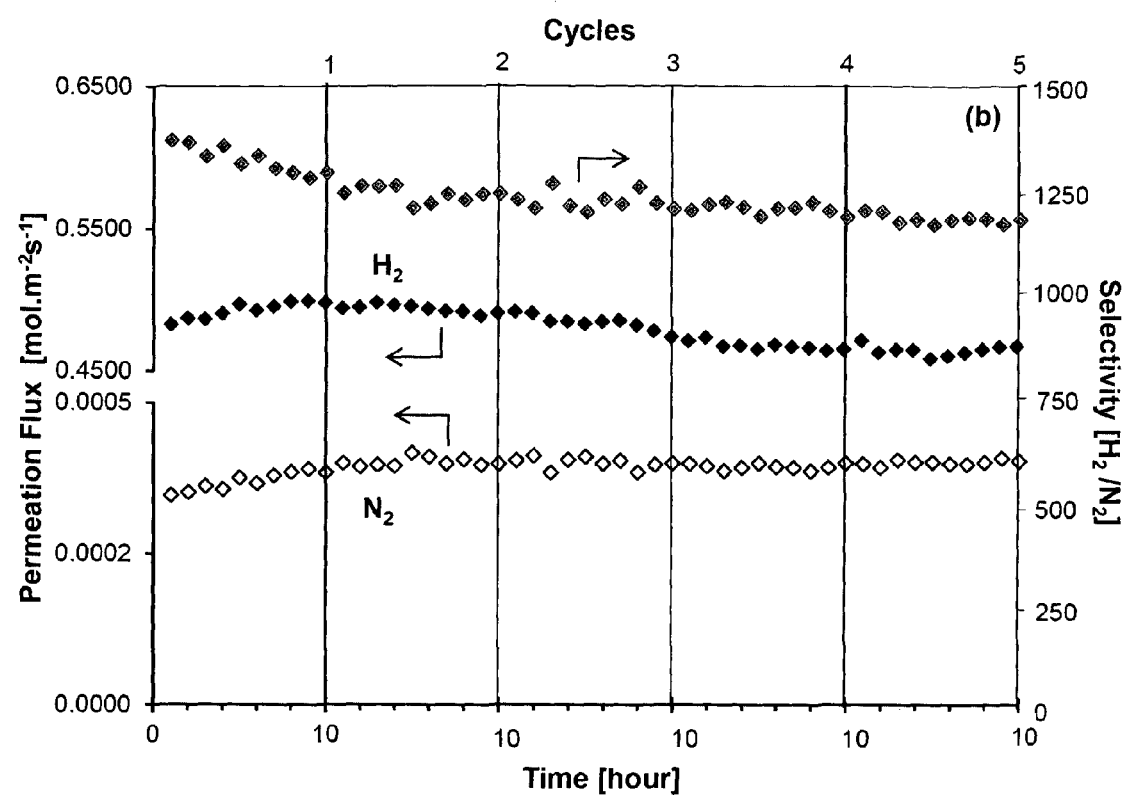

As shown in FIG. 6(*a*), comparative hollow fiber 3' demonstrated constant $H_2$ and $N_2$ permeation flux and $H_2$ selectivity in the first two cycles. Significant $N_2$ leakage and dramatic decrease of $H_2$ selectivity was observed after the third cycle, indicating cracking of the selection layer. The SEM images shown in FIG. 7 confirmed formation of small cracks after the third cycle and large cracks after the fifth cycle. By contrast, hollow fiber 3 exhibited constant $N_2$ permeation flux and $H_2$ selectivity during all the five cycles. See FIG. 6(*b*).

Figure 7:
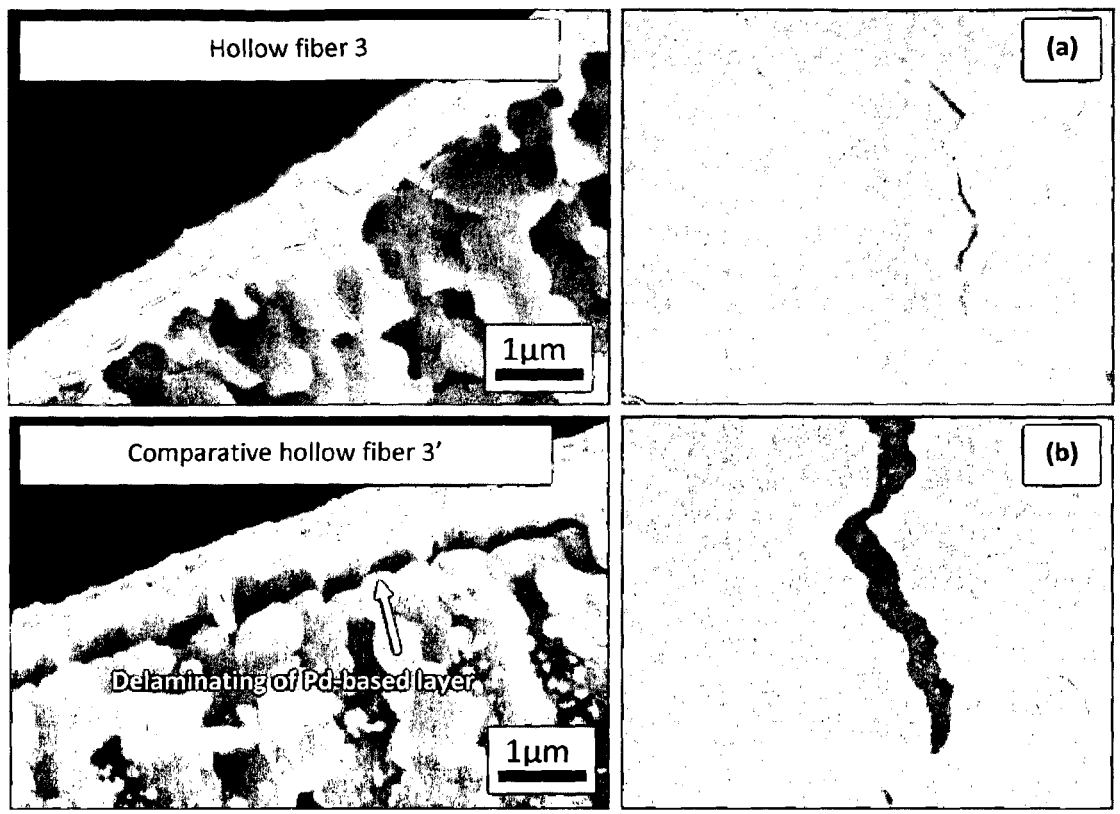
FIG. 7 shows the SEM images of hollow fiber 3, comparative hollow fiber 3', a small crack on the surface of comparative hollow fiber 3' after the third cycle of a stability test, and a larger crack after the fifth cycle.

Referring to FIG. 7, it shows a SEM image of (1) hollow fiber 3 (top left in the figure) having the selection layer interlocked with the support layer, (2) comparative hollow fiber 3' (bottom left) having the selection layer delaminated from the support layer, (3) a small crack on the selection layer contained in comparative hollow fiber 3' after the third cycle (a, top right), and (4) a large crack growing from the small crack after the fifth cycle (b, bottom right).

The tests unexpectedly showed that hollow fiber 3 was more durable than comparative hollow fiber 3'.

EXAMPLES 4-6

Hollow fibers 4, 5, and 6 were prepared following exactly the same procedure described in Example 2 except that the selection layers were 0.4 μm, 0.8 μm, and 1.2 μm, respectively.

These three hollow fibers were viewed under a scanning electron microscope (SEM), showing free of defects in their selection layers.

The hollow fibers were also tested for pressure-hold capacity at room temperature using hydrogen gas. They exhibited nearly identical pressure-hold capabilities at 300 kPa, demonstrating high safety.

The hollow fibers were also tested for hydrogen-permeable performance, following the procedure described in Example 7 below. The results are shown in Table 3 below.

According to Table 3, hollow fiber 5, containing the thinnest selection layer among the three hollow fibers, showed the highest $H_2$ reflux and the lowest $H_2$ selectivity; on the other hand, hollow fiber 7, containing the thickest selection layer, showed the lowest $H_2$ reflux and the highest $H_2$ selectivity; further, hollow fiber 6, containing the selection layer of an intermediate thickness, showed $H_2$ permeation flux similar to that of hollow fiber 5 and $H_2$ selectivity similar to that of hollow fiber 7. In sum, a hollow fiber containing a thinner selection layer had higher $H_2$ permeation flux and a hollow fiber containing a thicker selection layer had a higher $H_2$ selectivity.

TABLE 3

Hydrogen-permeable performance of hollow fibers 4, 5, and 6

| | Pd—Ag Membrane thickness | $H_2$ flux (mol $m^{-2}s^{-1}$) | $N_2$ flux (mol $m^{-2}s^{-1}$) | $H_2$ selectivity[§] ($H_2/N_2$) |
|---|---|---|---|---|
| Hollow fiber 4 | 0.4 μm | 0.87 | 0.00209 | 416 |
| Hollow fiber 5 | 0.8 μm | 0.80 | 0.00066 | 1212 |
| Hollow fiber 6 | 1.2 μm | 0.57 | 0.00036 | 1583 |

Note:
[§]$H_2$ selectivity = $H_2$ permenace/$N_2$ permeance

EXAMPLE 7

Hollow fibers 3-6 described above were tested for hydrogen-permeable performance, using both $H_2$ gas and a $H_2/N_2$ mixture at 450° C. The gas permeation tests were carried out on a reactor as shown in FIG. 3, which contained a 15-cm long hollow fiber. Both open ends of hollow fiber 4 were placed in stainless steel reactor shell 6. A feed stream, i.e., $H_2/N_2$, was pressurized and fed into the reactor via inlet 9 on stainless steel reactor shell 6. The pressure difference, controlled by a back-pressure regulator, was 100 kPa across the hollow fibers during the test. Helium, a sweep gas, was fed into hollow fiber 4 from one end at a flow rate of 20 ml/min. The permeated gas left hollow fiber 4 from the other end and was continuously analyzed by online gas chromatography having a thermal conductivity detector.

The results are shown in Table 3 above.

EXAMPLE 8

The performance of hollow fiber 2 was studied in carrying out catalytic decomposition of methane to produce $H_2$ at different temperatures (i.e., 450° C., 500° C., 550° C., and 600° C.) and at difference pressures (i.e., 1 bar, 1.5 bar, and 2 bar). Helium was used as the sweep gas in the counter-current configuration. The results are shown in FIGS. 8, 9, and 10 below.

FIG. 8 shows methane conversion rates as a function of reaction temperature during decomposition of methane in the conventional fixed-bed reactor described above in Example 2 (shown in FIG. 8 as O) and in hollow fiber 2 at a constant space velocity of 6,000 $cm^3 g^{-1} h^{-1}$. The reactions were carried out at 1 bar (shown in FIG. 8 as ♦), 1.5 bar (shown in FIG. 8 as ●), and 2 bar (shown in FIG. 8 as ▲). Unexpectedly, hollow fiber 2 showed a 10% increase in the methane conversion rate as compared to the conventional fixed-bed reactor. Hollow fiber 2 achieved a methane conversion rate of 55% at 600° C. and 2 bar.

FIG. 9 shows $H_2$ permeation flux and $H_2$ selectivity as a function of reaction temperature during decomposition of methane in hollow fiber 2. The reactions were carried out at 1 bar (shown in FIG. 9 as ♦), 1.5 bar (shown in FIG. 9 as ●), and 2 bar (shown in FIG. 9 as ▲). This figure shows that both $H_2$ permeation flux and $H_2$ selectivity increased as the reaction temperature or the reaction pressure increased. Hollow fiber 2 unexpectedly achieved $H_2$ permeation flux of 0.16 mol $m^{-2}$ $s^{-1}$ and $H_2$ selectivity of 98% at 600° C. and 2 bar.

FIG. 10 shows $H_2$ recovery as a function of reaction temperature during decomposition of methane in hollow fiber 2. The reactions were carried out at 1 bar (shown in FIG. 10 as ♦), 1.5 bar (shown in FIG. 10 as ●), and 2 bar (shown in FIG. 10 as ▲). As shown in FIG. 10, hollow fiber 2 unexpectedly achieved $H_2$ recovery of 84% at 600° C. and 2 bar.

What is claimed is:

1. A hollow fiber for use in production of hydrogen gas, the hollow fiber comprising a porous support layer having an outer surface and an inner surface, a catalyst layer coated on the outer surface, and a selection layer coated on the inner surface, wherein the hollow fiber has an outer diameter of 500 to 4000 μm and an inner diameter of 100 to 2000 μm; the support layer has a thickness of 100 to 500 μm and a pore size of 50 to 400 nm; the catalyst layer contains a catalyst, has a thickness of 100 to 500 μm, and has a pore size of 200 to 2000 nm; and the selection layer contains a palladium or palladium-alloy film and has a thickness of 0.3 to 10 μm.

2. The hollow fiber of claim 1, wherein the hollow fiber has an outer diameter of 1000 to 3000 μm and an inner diameter of 800 to 1600 μm, the support layer has a thickness of 150 to 250 μm, the catalyst layer has a thickness of 150 to 250 μm, and the selection layer has a thickness of 0.3 to 2 μm.

3. The hollow fiber of claim 2, wherein the catalyst is a metal or metal oxide containing Fe, Ni, Co, Cu, Mo, Rh, Ru, Pd, La, or a combination thereof; and the palladium or palladium alloy film is a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

4. The hollow fiber of claim 3, wherein the catalyst is $LaNiO_3$ and the palladium or palladium alloy film is a film containing palladium-silver alloy.

5. The hollow fiber of claim 1, wherein the catalyst is a metal or metal oxide containing Fe, Ni, Co, Cu, Mo, Rh, Ru, Pd, La, or a combination thereof.

6. The hollow fiber of claim 5, wherein the catalyst is $LaNiO_3$.

7. The hollow fiber of claim 6, wherein the palladium or palladium alloy film is a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

8. The hollow fiber of claim 7, wherein the palladium or palladium alloy film is a film containing palladium-silver alloy.

9. The hollow fiber of claim 5, wherein the palladium or palladium alloy film is a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

10. The hollow fiber of claim 9, wherein the palladium or palladium alloy film is a film containing palladium-silver alloy.

11. The hollow fiber of claim 1, wherein the palladium or palladium alloy film is a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

12. The hollow fiber of claim 11, wherein the palladium or palladium alloy film is a film containing palladium-silver alloy.

13. The hollow fiber of claim 12, wherein the selection layer has a thickness of 0.3 to 2 μm.

14. The hollow fiber of claim 13, wherein the selection layer has a thickness of 0.3 to 0.8 μm.

15. The hollow fiber of claim 11, wherein the selection layer has a thickness of 0.3 to 2 μm.

16. The hollow fiber of claim 15, wherein the selection layer has a thickness of 0.3 to 0.8 μm.

17. The hollow fiber of claim 1, wherein the selection layer has a thickness of 0.3 to 2 μm.

18. The hollow fiber of claim 17, wherein the selection layer has a thickness of 0.3 to 0.8 μm.

19. The hollow fiber of claim 18, wherein the hollow fiber has an outer diameter of 1000 to 3000 μm and an inner diameter of 800 to 1600 μm, the support layer has a thickness of 150 to 250 μm, the catalyst layer has a thickness of 150 to 250 μm, and the selection layer has a thickness of 0.3 to 2 μm, the catalyst being a metal or metal oxide containing Fe, Ni, Co, Cu, Mo, Rh, Ru, Pd, La, or a combination thereof, and the palladium or palladium alloy film being a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

20. The hollow fiber of claim 19, wherein the catalyst is $LaNiO_3$ and the palladium or palladium alloy film is a film containing palladium-silver alloy.

21. The hollow fiber of claim 17, wherein the hollow fiber has an outer diameter of 1000 to 3000 μm and an inner diameter of 800 to 1600 μm, the support layer has a thickness of 150 to 250 μm, the catalyst layer has a thickness of 150 to 250 μm, and the selection layer has a thickness of 0.3 to 2 μm, the catalyst being a metal or metal oxide containing Fe, Ni, Co, Cu, Mo, Rh, Ru, Pd, La, or a combination thereof, and the palladium or palladium alloy film being a film containing palladium, palladium-silver alloy, palladium-silver-copper alloy, palladium-silver-cobalt alloy, palladium-gold-cobalt alloy, palladium-gold-iridium alloy, palladium-gold-rhodium alloy, or a combination thereof.

22. The hollow fiber of claim 21, wherein the catalyst is $LaNiO_3$ and the palladium or palladium alloy film is a film containing palladium-silver alloy.

23. A method of preparing a hollow fiber, the method comprising:
- providing a porous hollow fiber support having an outer surface and an inner surface;
- coating a catalyst layer on the outer surface; and
- coating a selection layer on the inner surface, thereby forming the hollow fiber, wherein the porous hollow fiber support has an outer diameter of 200 to 3000 μm, an inner diameter of 100 to 2000 μm, and a pore size of 50 to 400 nm; the catalyst layer contains a catalyst, has a thickness of 100 to 500 μm, and has a pore size of 200 to 2000 nm; and the selection layer contains a palladium or palladium-alloy film and has a thickness of 0.3 to 10 μm.

24. The method of claim 23, further comprising:
- forming a protection film covering the catalyst layer before coating the selection layer; and
- removing the protection film after coating the selection layer.

\* \* \* \* \*